US008983456B2

(12) United States Patent
You (10) Patent No.: US 8,983,456 B2
(45) Date of Patent: Mar. 17, 2015

(54) METHOD AND SYSTEM FOR IMPLEMENTING SINGLE RADIO VOICE CALL CONTINUITY (75) Inventor: Jianjie You, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 263 days.

(21) Appl. No.: 13/258,443

(22) PCT Filed: Jan. 19, 2011

(86) PCT No.: PCT/CN2011/070398
§ 371 (c)(1),
(2), (4) Date: May 18, 2012

(87) PCT Pub. No.: WO2011/127760
PCT Pub. Date: Oct. 20, 2011

(65) Prior Publication Data
US 2013/0035094 A1 Feb. 7, 2013
US 2013/0137426 A2 May 30, 2013

(30) Foreign Application Priority Data
Apr. 15, 2010 (CN) .......................... 2010 1 0148708

(51) Int. Cl.
*H04W 4/00* (2009.01)
*H04W 36/00* (2009.01)
(Continued)

(52) U.S. Cl.
CPC .......... *H04W 36/0055* (2013.01); *H04W 28/16* (2013.01); *H04W 36/26* (2013.01)
USPC ..... 455/432.1; 455/432; 455/422; 455/456.2; 455/457; 455/456.1; 455/560; 455/450; 455/451; 455/452.2

(58) Field of Classification Search
USPC ........ 455/450, 451, 452.2, 456.1, 456.2, 457, 455/432.1, 422.1, 560
See application file for complete search history.

(56) References Cited

U.S. PATENT DOCUMENTS 5,570,412 A * 10/1996 LeBlanc ..................... 455/456.2
5,602,903 A * 2/1997 LeBlanc et al. ............. 455/456.2
(Continued)

FOREIGN PATENT DOCUMENTS

CN         1988722 A      6/2007
CN      101047989 A     10/2007
(Continued)

OTHER PUBLICATIONS

A Review of Policy-Based Resource and Admission Control Functions in Evolving Access and Next Generation Networks Christian Esteve Rothenberg Æ Andreas Roos,2008.*
(Continued)

*Primary Examiner* — Joseph Arevalo
(74) *Attorney, Agent, or Firm* — Ling Wu; Stephen Yang; Ling and Yang Intellectual Property (57) ABSTRACT

Disclosed in the present invention are a resource policy decision method and system in a roaming scenario, for improving the accuracy of the resources allocated to the user. The method includes: after having received an available resource query message from a mobility management and control function MMCF entity, a resource and admission control function RACF entity of a visited network acquiring degrade information of current service of a user from a resource and admission control platform, and according to a candidate access network list in the available resource query message, checking current availability of resource of each candidate access network in the candidate access network list, so as to obtain resource availability information of each candidate access network; the RACF entity of the visited network carrying out resource decision according to the degrade information, the resource availability information and user information of the user.

18 Claims, 4 Drawing Sheets

(51) Int. Cl.
*H04W 28/16* (2009.01)
*H04W 36/26* (2009.01)

(56) References Cited

U.S. PATENT DOCUMENTS 5,960,341 A * 9/1999 LeBlanc et al. ............ 455/426.1
2011/0173330 A1 * 7/2011 Gong et al. ................... 709/226

FOREIGN PATENT DOCUMENTS

CN 101247652 A 8/2008
WO 2009112639 A1 9/2009

OTHER PUBLICATIONS

International Search Report for PCT/CN2011/070398 dated Apr. 18, 2011.

* cited by examiner

METHOD AND SYSTEM FOR IMPLEMENTING SINGLE RADIO VOICE CALL CONTINUITY

TECHNICAL FIELD

The present invention relates to the communication field, and particularly, to a resource policy decision method and system in a roaming scenario.

BACKGROUND OF THE RELATED ART

Currently, the Network Generation Network (abbreviated as NGN) is a hotspot research topic in the current communication standard field, which employs the IP packet technology as the bearer network technology and converges fixed communication and mobile communication, and thus NGN can provide richer multimedia services, for example, emerging services which has real-time requirements (IP television, video conference, multimedia remote education, video on demand, etc.), and these services require that the communication network can provide support to highly efficient end-to-end quality of service (abbreviated as QoS); and at the same time, the requirements of the user on the quality of service of the network are also higher and higher. Therefore, providing end-to-end quality of service is one of the core problems of NGN.

Figure 1:
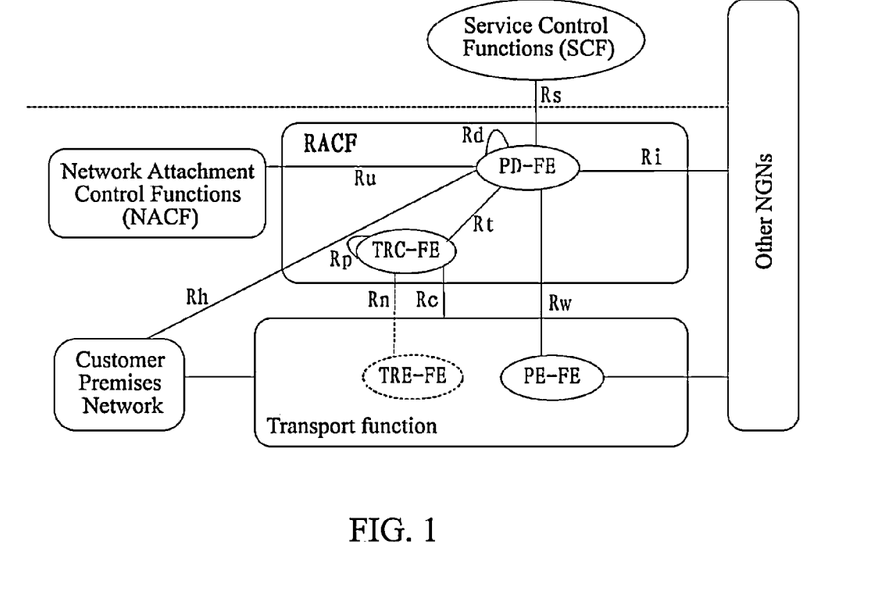
FIG. 1 is a schematic diagram of the function framework of an ITU-T RACF in the related art.

The International Telecommunications Union-Telecommunications standardization sector (abbreviated as ITU-T) is the telecommunication sector of the International Telecommunications Union and formulates relevant standards on resource and admission control. In the latest Resource and Admission Control Functions (abbreviated as RACF) draft released by ITU-T, the function framework of the RACF is provided, as shown in FIG. 1, RACF consists of two parts, which are respectively Policy Decision Functional Entity (abbreviated as PD-FE) and Transport Resource Control Functional Entity (TRC-FE), wherein TRC-FE interacts with the transport function via Rc and interacts with the Transport Resource Enforcement Functional Entity (abbreviated as TRE-FE) via Rn, and PD-FE interacts with TRC-FE via Rt, interacts with the Customer Premises Network (abbreviated as CPN) via Rh, interacts with the Policy Enforcement Functional Entity (abbreviated as PE-FE) via Rw, interacts with the Service Control Functions (abbreviated as SCF) at the service layer via Rs, interacts with the Network Attachment Control Functions (abbreviated as NACF) via Ru, and PD-FE interacts with the other Next Generation Networks via an Ri interface.

In addition, PD-FE is irrelevant to the transport technology and irrelevant to SCF, PD-FE makes the final decision of resource and admission control based on the network policy rules, service information provided by SCF, transport layer subscription information provided by NACF, and the resource availability decision result provided by TRC-FE.

TRC-FE is irrelevant to the service but relevant to the transport technology. TRC-FE is responsible for collecting and maintaining the transport network information and resource state information. After receiving a resource request from PD-FE, TRC-FE enforces resource based admission control based on QoS, priority demand, resource availability information and transport relevant policy rules.

The transport layer consists of a Policy Enforcement Functional Entity (abbreviated as PE-FE) and a Transport Resource Enforcement Functional Entity (abbreviated as TRE-FE). PE-FE enforces the policy rules issued by PD-FE. PE-FE is a packet to packet gateway and can be located between the Customer Premises Network (abbreviated as CPN) and the access network, between the access network and the core network, or between different operator networks, and it is a key node supporting dynamic QoS control, port address translation control and network address translator (abbreviated as NAT) traversing. TRE-FE enforces the transport resource policy rules issued by TRC-FE, and its scope and function and Rn interface are to be further researched, which does not belong to the research scope of the R2 stage.

3GPP (The 3rd Generation Partnership Project) proposes PCC (Policy Control and Charging) from the view of mobile access to complete the Resource and Admission Control Functions. The key function entity of 3GPP PCC is PCRF (Policy and Charging Rule Function): including policy control decision and control function of charging by traffic. PCRF provides network control functions such as detection, gating, QoS and charging by traffic to relevant service data stream for PCEF (Policy and Charging Enforcement Function).

ITU-T formulates the mobility management and control function (abbreviated as MMCF) and describes the mobility management, control framework and architecture in the NGN transport layer, and this architecture supports the IP mobility of the user equipment in the NGN transport layer; and describes that despite the user uses fixed or mobile access technology, the service continuity is ensured when the terminal attachment points between different access technologies are changed. MMCF supports to interact with RACF (M8 interface), NACF, SCF and transport function.

Figure 2:
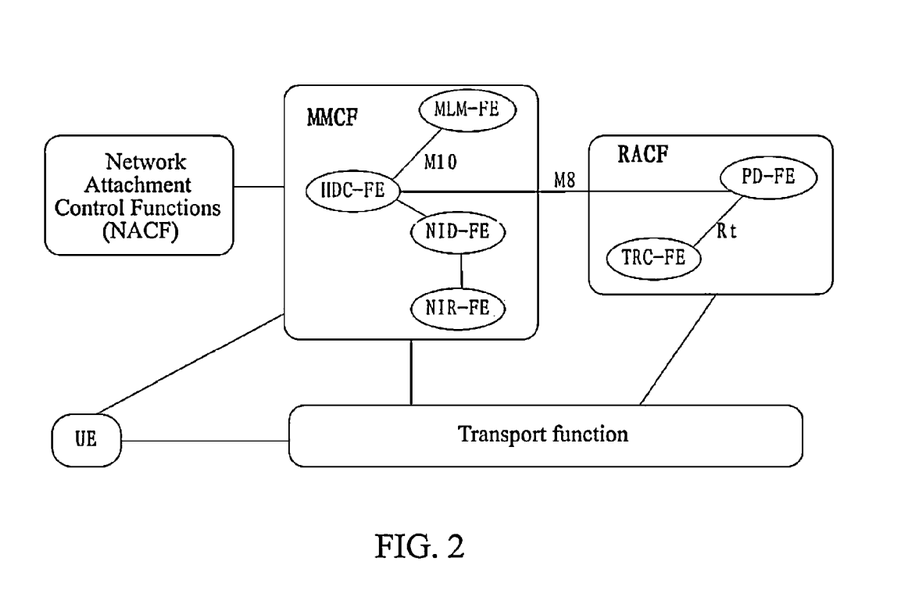
FIG. 2 is a schematic diagram of the function framework of an ITU-T MMCF in the related art.

As shown in FIG. 2, MMCF includes a Mobile Location Management Functional Entity (abbreviated as MLM-FE) which is responsible for location management, location information binding, also includes a Handover Decision and Control Functional Entity (abbreviated as HDC-FE) which is mainly responsible for handover decision, layer 2 handover control and layer 3 handover control; also includes a Network Information Distribution Functional Entity (abbreviated as NID-FE) which is mainly responsible for distributing the handover policy, such as the handover rule parameters defined by the operators; also includes a Network Information Repository Functional Entity (NIR-FE) which is mainly responsible for providing the neighbor access network information, attachment point information and operator policy near the user.

Figure 3:
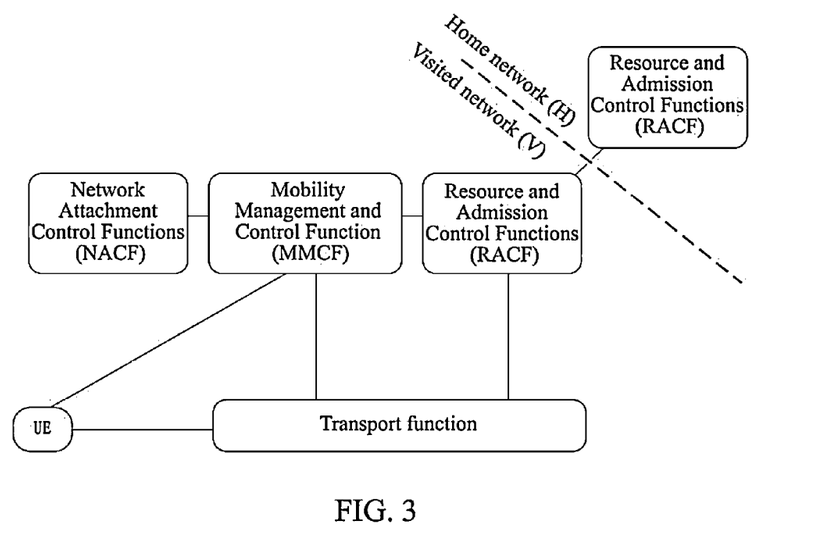
FIG. 3 is a roaming scenario of a user in the related art.

The user accesses the service in the home network and the RACF or PCRF (Policy and Charging Rule Function) of the home network provides QoS support to the user. The location of the user moves and roams to the visit access network, as shown in FIG. 3, the NACF of the visitedvisited network carries out access management authentication on the user and the MMCF carries out handover preparation thereon so as to ensure the continuity of the user service.

When the MMCF is preparing for handover, the MMCF sends to the RACF an available resource query message, which carries the user identifier and a candidate handover access point list; and after having received the query message, the RACF replies with a response message, which carries the user identifier and the resource state of the corresponding candidate handover access point.

In the related art, after the RACF has received the available resource query message from the MMCF, the RACF needs to carry out resource policy decision so as to decide the resources to be allocated to the user, however, the resources allocated to the user by the current resource policy decision method are inaccurate, which may cause to still maintain degraded quality of service for the user when the user roams, thus bringing bad experience to the user.

SUMMARY OF THE INVENTION

The object of the present invention it to provide a resource policy decision method and system in a roaming scenario, for improving the accuracy of the resources allocated to the user.

In order to solve the above technical problem, the present invention provides a resource policy decision method in a roaming scenario, comprising:

after having received an available resource query message from a mobility management and control function MMCF entity, a resource and admission control function RACF entity of a visited network acquiring degrade information of current service of a user from a resource and admission control platform, and according to a candidate access network list in the available resource query message, checking current availability of resource of each candidate access network in the candidate access network list, so as to obtain resource availability information of each candidate access network;

the RACF entity of the visited network carrying out resource decision according to the degrade information, the resource availability information and user information of the user.

Preferably, the user information comprises resource information of the current service of the user and original resource information of the service of the user.

Preferably, the resource information of the current service of the user and the original resource information of the service of the user comprises one or any combination of: bandwidth information and priority information.

Preferably, the resource and admission control platform refers to an RACF entity of a home network or a policy and charging rule function PCRF entity of the home network.

Preferably, the step of the RACF entity of the visited network checking current availability of resource of each candidate access network in the candidate access network list comprises: the RACF entity of the visited network checks whether each candidate access network has available resources.

Preferably, the degrade information comprises a parameter indicating whether or not already degraded, and the parameter indicating whether or not already degraded is used for indicating whether the current service of the user has been degraded.

Preferably, the step of the RACF entity of the visited network carrying out resource decision according to the degrade information, the resource availability information and user information of the user comprises:

if it is determined according to the degrade information that the current service of the user has been degraded, then in addition to choosing the candidate access network with the available resources meeting demand of the current service of the user, further choosing the candidate access network with the available resources meeting demand of the original resource information of the service of the user; and/or if it is determined according to the degrade information that the current service of the user has not been degraded, then in addition to choosing the candidate access network with the available resources meeting the demand of the current service of the user, in case when the current service of the user allows degradation, further choosing the candidate access network with the available resources meeting the demand of the degraded service of the user.

Preferably, the degrade information further comprises a parameter indicating whether able to degrade, and the parameter indicating whether able to degrade is used for indicating whether degrade operation is allowed for the quality of service QoS of the current service of the user in case of insufficient resources.

Preferably, the step of the RACF entity of the visited network carrying out resource decision according to the degrade information, the resource availability information and user information of the user further comprises:

if the RACF entity of the visited network judges that the current resources of a certain candidate access network fail to meet the demand of the current service of the user, and the parameter for indicating whether or not already degraded of the current service of the user indicates that it has been degraded, then the RACF entity of the visited network feeding back to the MMCF entity that resource state of that candidate access network is unavailable;

if the RACF entity of the visited network judges that the current resources of a certain candidate access network fail to meet the demand of the current service of the user, but the parameter for indicating whether or not already degraded of the current service of the user indicates that it has not been degraded and the parameter indicating whether able to degrade indicates that the degrade operation is allowable, then the RACF entity of the visited network further judging whether the current resources of that candidate access network can meet the demand of the degraded service of the user, if yes, then the RACF entity of the visited network configuring the parameter for indicating whether or not already degraded of that candidate access network as already degraded, and feeding back to the MMCF entity that the resource state of that candidate access network is available, by which the parameter for indicating whether or not already degraded of that candidate access network is carried at the same time;

if the RACF entity of the visited network judges that the current resources of a certain candidate access network can meet the demand of the current service of the user, then it feeds back to the MMCF entity that the resource state of that candidate access network is available.

Preferably, the step of if the RACF entity of the visited network judges that the current resources of a certain candidate access network can meet the demand of the current service of the user, then it feeds back to the MMCF entity that the resource state of that candidate access network is available comprises: after the RACF entity of the visited network judges that the current resources of a certain candidate access network can meet the demand of the current service of the user, the RACF entity further judging whether the parameter for indicating whether or not already degraded of the current service of the user is already degraded, if yes, then the RACF entity judging whether the current resources of the candidate access network can meet the demand of the original resource information of the service of the user according to original resource information of the service of the user, if yes, then the RACF entity feeds back to the MMCF entity that the resource state of that candidate access network is available, if not, then the RACF entity configuring the parameter for indicating whether or not already degraded of that candidate access network as already degraded, and carrying the parameter for indicating whether or not already degraded of that candidate access network while feeding back to the MMCF entity that the resource state of that candidate access network is available.

Preferably, after the RACF entity of the visited network has carried out resource decision, the RACF entity feeding back a resource decision result to the MMCF entity; and the MMCF entity selecting an available access network for the user according to the resource decision result and takes the selected access network as a handover decision result to feed back to the user.

Preferably, the step of selecting an available access network for the user comprises: judging whether there is an available access network without needing to be degraded, if yes, then selecting the available access network without needing to be degraded; and if not, then selecting the degraded available access network.

Preferably, the resource decision result comprises the resource state information of each candidate access network in the candidate access network list, and the parameter for indicating whether or not already degraded, when the resource state information of a certain candidate access network indicates available, of that candidate access network, wherein, the parameter for indicating whether or not already degraded of that candidate access network is used for indicating if the user accesses that candidate access network, then the service of the user needs to degrade or still needs to maintain the state of the current degraded service.

In order to solve the above technical problem, the present invention also provides a resource policy decision system in a roaming scenario, comprising: a mobility management and control function (MMCF) entity, a resource and admission control function (RACF) entity of a visited network and a resource and admission control platform, wherein the MMCF entity is configured to send an available resource query message to the RACF entity of the visited network when preparing for handover;

the RACF entity of the visited network comprises a receiving unit, a sending unit, a resource availability checking unit and a resource deciding unit, wherein the receiving unit is configured to: receive the available resource query message sent by the MMCF entity and receive degrade information of current service of a user fed back by the resource and admission control platform;

the sending unit is configured to send a request of acquiring the degrade information of the current service of the user to the resource and admission control platform;

the resource availability checking unit is configured to, according to a candidate access network list in the available resource query message, check the current resource availability of each candidate access network in the candidate access network list so as to obtain the resource availability information of each candidate access network;

the resource deciding unit is configured to carry out resource decision according to the degrade information, the resource availability information and user information of the user;

the resource and admission control platform is configured to feed back the degrade information of the current service of the user to the RACF entity of the visited network.

By way of the method and system in the present invention, it is ensured that the user can still enjoy normal quality of service when roaming.

The other features and advantages of the present invention will be set forth in the subsequent specification, and partly become apparent from the specification or are understood by implementing the present invention. The objects and other advantages of the present invention can be realized and obtained by the structures particularly specified in the specification, claims and accompanying drawings.

BRIEF DESCRIPTION OF DRAWINGS

The drawings are used to provide a further understanding for the present invention, and constitute a part of the specification. The drawings are used to illustrate the present invention along with embodiments of the present invention and not intended to limit the present invention. In the drawings.

PREFERRED EMBODIMENTS OF THE PRESENT INVENTION

The inventive concept of the present invention is as follows: after having received an available resource query message from a mobility management and control function (MMCF) entity, a resource and admission control function (RACF) entity of a visited network acquires degrade information of the current service of a user from a resource and admission control platform, and according to a candidate access network list in the available resource query message, checks the availability of the current resource of each candidate access network in the candidate access network list, so as to obtain the resource availability information of each candidate access network; and the RACF entity of the visited network carries out resource decision according to the degrade information, resource availability information and user information of the user.

As to those users with the QoS or priority thereof being degraded, the RACF of the visited network carries out resource decision thereon with reference to the degrade information of the current services of these users, so that these users can still have opportunity to enjoy normal quality of service in the roaming scenario.

Since the service corresponds to the session one by one, the degrade information of the service can also be viewed as the degrade information of the session corresponding to the service, i.e. the RACF of the visited network can acquire the degrade information about the current session of the user from the resource and admission control platform, thus, in the subsequent processing, the session is taken as the basis.

Hereinafter, the RACF without special illustration refers to the RACF of the visited network.

The resource and admission control platform refers to the RACF entity of the home network or the PCRF entity of the home network. The RACF discovers the RACF or PCRF of the home network according to the user identifier in the available resource query message sent thereto by the MMCF entity, and sends to the RACF or PCRF of the visited network a media stream resource information query message, which carries the user identifier, so as to acquire the degrade information of the current service of the user.

The user information comprises the resource information of the current service (or session) of the user and the original resource information of the service of the user. The resource information of the current service of the user and the original resource information of the service of the user includes at least bandwidth information and/or priority information, and they can also include one or more of the following pieces of information: service type, stream description (quintuple), charging relevant information. It needs to note that the original resource information of the service of the user is initially issued to the RACF by the application control function (SCF).

The RACF of the visited network can acquire the user information by the following approaches: acquire from the NACF of the visited network, or acquire from the RACF of the home network, or acquire from the PCRF of the home network. After having received the query message, the RACF or PCRF of the home network can reply to the RACF of the visited network the user information and the degrade information.

In particular: the degrade information includes two parameters for indicating whether or not already degraded and whether able to degrade:

the parameter for indicating whether or not already degraded is used for indicating whether the QoS or priority of the current service of the user is degraded, i.e. indicating whether the QoS or priority of the current service of the user is that after being degraded. Usually, the QoS or priority of the service of the user will be degraded only in case of insufficient resources, and herein, if already degraded, then this parameter for indicating whether or not already degraded is set as valid (such as 1), and if not degraded, then it is set as invalid (such as 0). Hereinafter, if the "indicating whether or not already degraded" is not illustrated specially, it refers to the parameter for indicating whether or not already degraded in the degrade information.

The parameter for indicating whether able to degrade is used for indicating whether a degrade operation is allowable for the QoS or priority of the current service of the user in case of insufficient resources, and herein, if degradation is allowable, then this parameter for indicating whether able to degrade is set as valid (such as 1), and if not, then it is set as invalid (such as 0). In other embodiments, the degrade information can only include the parameter for indicating whether or not already degraded, as long as this parameter is carried, then it implicitly indicates that the service of the user can be degraded.

The RACF of the visited network carrying out resource decision according to the degrade information, the resource availability information and the user information of the user refers to:

if it is determined according to the degrade information that the current service of the user has been degraded, then in addition to choosing the candidate access network with the available resources meeting demand of the current service of the user, further choosing the candidate access network with the available resources meeting demand of the original resource information of the service of the user; and/or if it is determined according to the degrade information that the current service of the user has not been degraded, then in addition to choosing the candidate access network with the available resources meeting the demand of the current service of the user, in case when the current service of the user allows degradation, further choosing the candidate access network with the available resources meeting the demand of the degraded service of the user. As to the same user, during handover, the candidate access network has the corresponding parameter for indicating whether or not already degraded (this parameter can be set for all the candidate access networks, or this parameter is only set for part of candidate access networks for which the service of the user needs to be degraded when accessing), when a certain candidate access network is chosen to be the user access network, the parameter for indicating whether or not already degraded in this candidate access network is exactly the parameter for indicating whether or not already degraded in the degrade information of the current service of the user.

The resource decision of the RACF of the visited network particularly includes:

if the RACF of the visited network judges that the current resources of a certain candidate access network fail to meet the demand of the current service of the user, i.e. fails to meet the demand of the media stream bandwidth or priority of the current service of the user, and the parameter for indicating whether or not already degraded is valid, then the RACF feeds back to the MMCF that the resource sate of this candidate access network is unavailable;

if the RACF of the visited network judges that the current resources of a certain candidate access network fail to meet the current service demand of the user but the parameter for indicating whether or not already degraded is invalid and the parameter indicating whether able to degrade is valid, the RACF feeds back an indication that there are not enough resources to the requester (SCF) via the RACF of the home network, and the requesters degrades the QoS of the user service, then the RACF rechecks the resource availability; if the current resources can meet the demand of the degraded service of the user, then the RACF sets the parameter for indicating whether or not already degraded of the current candidate access network, at this moment, the parameter for indicating whether or not already degraded of the current candidate access network indicates that if the UE accesses this candidate access network then it is required to degrade the service, the RACF feeds back to the MMCF that the resource state of this candidate access network is available and carries the parameter for indicating whether or not already degraded for the current candidate access network; if the current resources fail to meet the demand of the degraded service of the user, then the RACF feeds back to the MMCF that the resource state of this candidate access network is unavailable;

if the RACF of the visited network judges that the current resources of a certain candidate access network meet the demand of the current service of the user, then the RACF feeds back to the MMCF that the resource state of this candidate access network is available; preferably, before the feedback to the MMCF, the RACF firstly judges the parameter for indicating whether or not already degraded of the current service of the user, if it is valid, then it judges whether the current resources meet the demand of the original resource information of the user service according to the original resource information of the user service, if they can meet, then it feeds back to the MMCF that the resource state of this candidate access network is available, and if they cannot meet, then the parameter for indicating whether or not already degraded of the current access network is set as valid, preferably, the parameter for indicating whether or not already degraded in the degrade information is taken as the parameter for indicating whether or not already degraded in the current access network, and the parameter for indicating whether or not already degraded of the current access network is carried while feeding back to the MMCF that the resource state of this candidate access network is available, at this moment, the parameter for indicating whether or not already degraded of the current access network indicates that if the UE accesses this candidate access network then it still needs to maintain the state of the current degraded service QoS.

After having carried out resource decision, the RACF of the visited network feeds back the resource decision result to the MMCF. It can be known from the above operations that the resource decision result fed back by the RACF to the MMCF includes at least the resource state information about each candidate access network in the candidate access network list (i.e. whether it is available). If the resource state information of a candidate access network indicates available, the resource decision result fed back by the RACF to the MMCF also includes the parameter for indicating whether or not already degraded of the current access network, which is used for indicating that if the UE accesses this candidate access network then it needs to degrade the service QoS or it still needs to maintain the state of the current degraded service QoS.

The MMCF chooses an available access network for the UE according to the resource decision result sent thereto by the RACF, and it preferably chooses an access network with enough resources for this UE to maintain the original QoS or priority, i.e. an available access network without needing to be degraded, and feeds back the chosen access network as the handover decision result to the UE.

Hereinafter, the present invention will be described in detail in conjunction with the accompanying drawings and embodiments.

Figure 4:
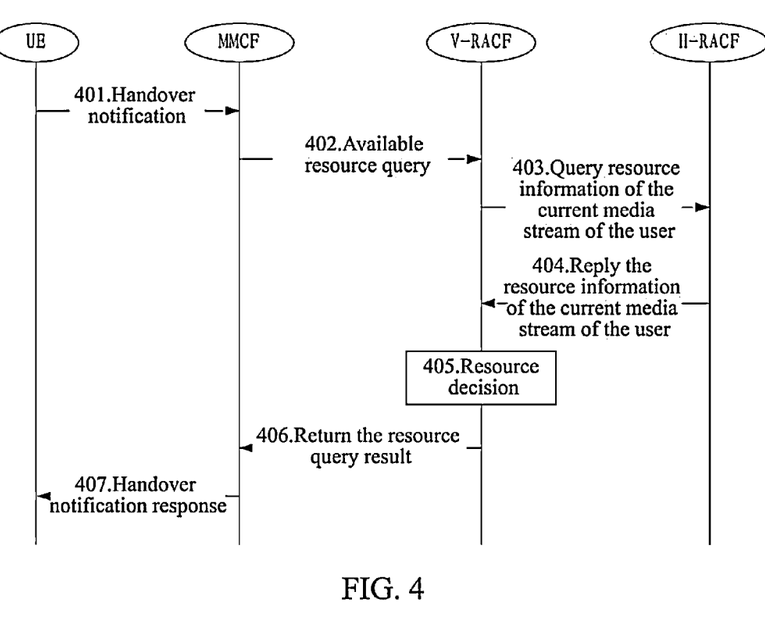
FIG. 4 is a flowchart of an embodiment 1 of the present invention.

FIG. 4 is the handover flow that the home network is the RACF in the resource and admission control method in the roaming scenario in the embodiments of the present invention, and the V-RACF in the figure represents the RACF of the visited network, and H-RACF represents the RACF of the home network. This flow includes the following steps.

In step 401, the user initiates a handover notification message to the MMCF, and the message carries the user identifier and a candidate access point list.

The MMCF is the MMCF of the visited network.

In step 402, the MMCF sends to the RACF an available resource query message, which carries the user identifier and the candidate access point list.

In step 403, the RACF discovers the RACF of the home network according to the user identifier (the user identifier includes home network information of the user) and sends to the RACF of the home network a user media stream resource information query message, which carries the user identifier.

In step 404, after having received the query message, the RACF of the home network replies the degrade information of this user and the user information including the current media stream resource information of the user and the original resource information about the user service to the RACF of the visited network.

In step 405, the RACF carries out resource availability check and resource decision.

The particular check and decision process can be made reference to the following description.

In step 406, the RACF replies an available resource query response message to the MMCF, which message carries the resource decision result, including the resource state of the access network and the parameter for indicating whether or not already degraded of each candidate access network.

In step 407, the MMCF replies a response message to the UE, which message carries the handover decision result.

The MMCF chooses the best access network for the user according to the resource state information of the candidate access network fed back by the RACF and the parameter for indicating whether or not already degraded of the candidate access network, i.e. an available access network without needing to be degraded, and feeds back the chosen access network as the handover decision result to the UE.

Figure 5:
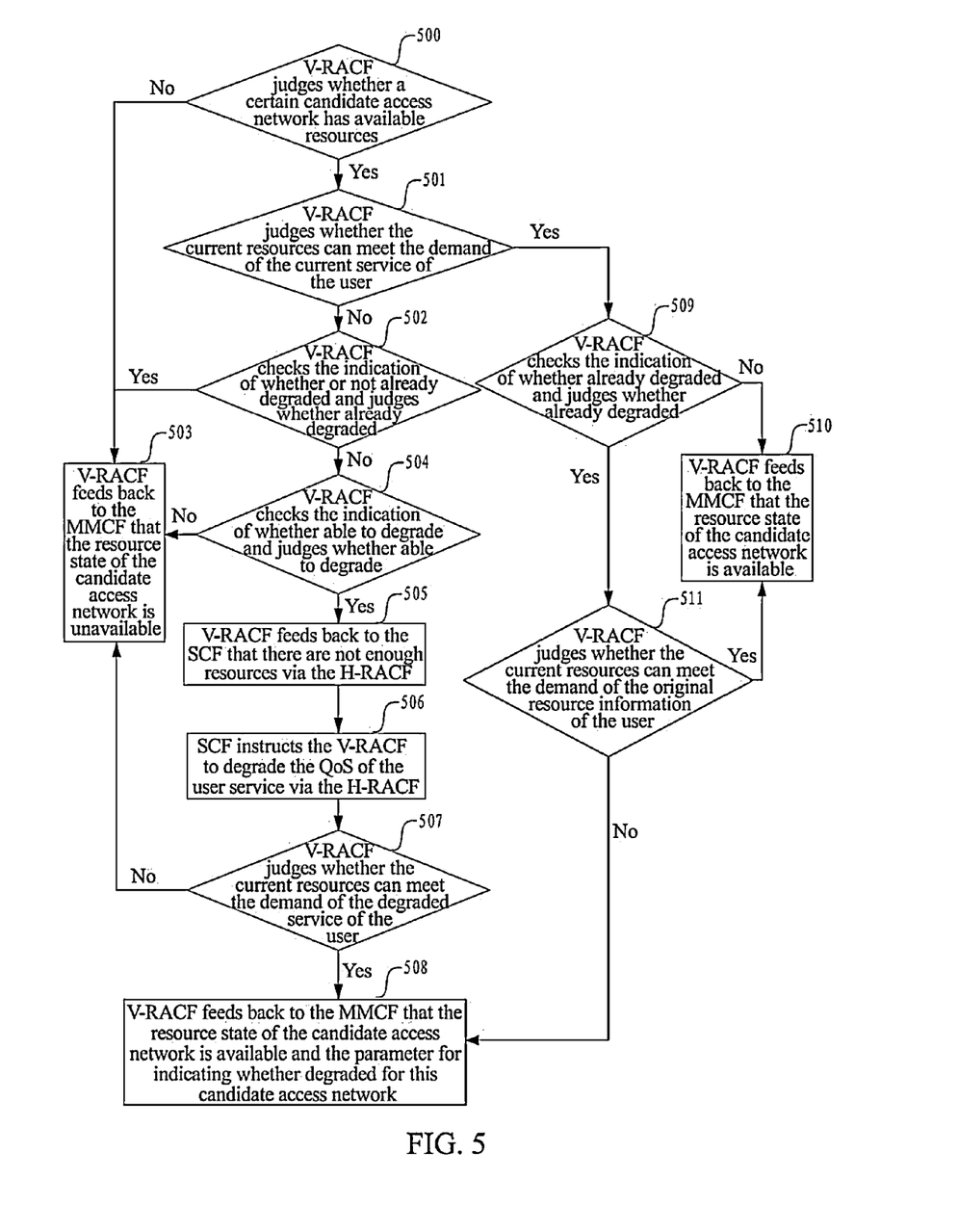
FIG. 5 is a flowchart of V-RACF carrying out resource availability check and resource decision.

In the above step 405, the V-RACF carries out resource availability check and resource decision, referring to FIG. 5, this process particularly includes the following steps.

In step 500, the V-RACF checks whether each candidate access network in the candidate access network list has available resources, and for a candidate access network with available resources, the V-RACF performs the following resource decision steps, and if there is no available resource, then perform step 503.

In step 501, the V-RACF judges whether a certain candidate access network can meet the demand of the current service (or session) of the user according to the current media stream resource information of the user, if it can meet, then perform step 509, otherwise, perform step 502.

The demand of the current service (or session) of the user is judged on the basis of the current media stream resources of the user.

In step 502, the V-RACF checks the parameter for indicating whether or not already degraded of the current service of user, and judges whether the QoS of the current service of the user has been degraded, if degraded, then perform step 503, otherwise, perform step 504.

In step 503, the V-RACF feeds back to the MMCF that the resource state of the candidate access network is unavailable.

If there is another candidate access network, then return to step 501, perform this flow again, and judge whether the other candidate access networks are available. If there is no other candidate access network, then this flow is ended.

In step 504, the V-RACF checks the parameter for indicating whether able to degrade of the user, and judges whether the QoS of the current service of the user can be degraded, if yes, then perform step 505, otherwise, perform step 503.

In step 505, the V-RACF feeds back to the SCF the information that there are not enough resources via the H-RACF.

In step 506, the SCF indicates the V-RACF to degrade the QoS of the user service via the H-RACF, and the V-RACF sets the parameter for indicating whether or not already degraded of the current candidate access networks as valid.

Here, the degradation is only pre-degradation so that the V-RACF sets the parameter for indicating whether or not already degraded of the current candidate access network.

In step 507, the V-RACF judges whether the current resources can meet the service demand after the QoS of the user service has been degraded, if they can meet, then perform step 508, otherwise, perform step 503.

In step 508, the V-RACF feeds back to the MMCF that the resource state of the candidate access network is available, and at the same time feeds back the parameter for indicating whether or not already degraded of this candidate access network.

If there is another candidate access network, then return to step 501, perform this flow again, and judge whether the other candidate access networks are available. If there is no other candidate access network, then this flow is ended.

In step 509, the V-RACF checks the parameter for indicating whether or not already degraded of the current service of user, and judges whether the QoS of the current service of the user has been degraded, if degraded, then perform step 511, otherwise, perform step 510.

In step 510, the V-RACF feeds back to the MMCF that the resource state of the candidate access network is available.

If there is another candidate access network, then return to step 501, perform this flow again, and judge whether the other candidate access networks are available. If there is no other candidate access network, then this flow is ended.

In step 511, the V-RACF judges whether the current resources can meet the demand of the original resource information of the user service, if they can meet, then perform step 510, otherwise, perform step 508.

Figure 6:
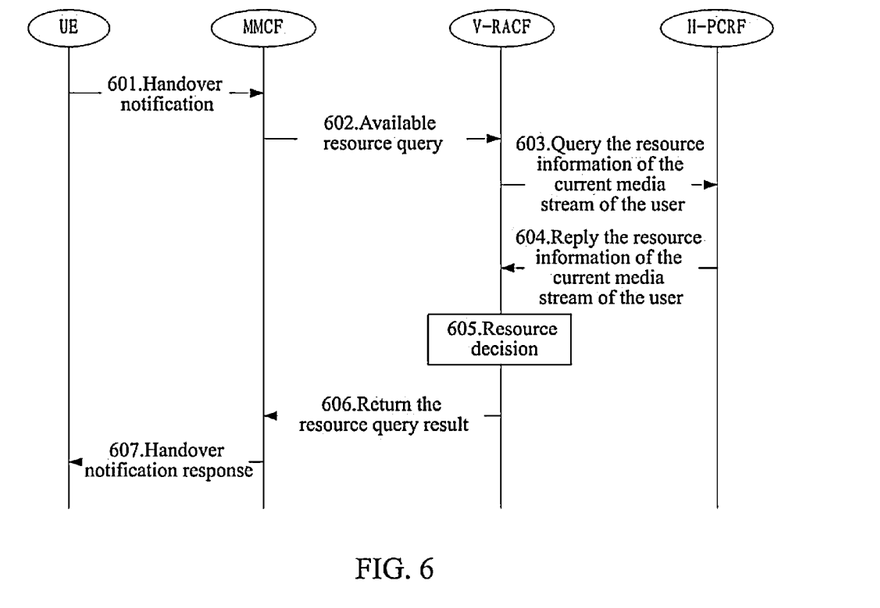
FIG. 6 is a flowchart of an embodiment 2 of the present invention.

FIG. 6 is a handover flow when the home network is PCRF in the resource and admission control method in the roaming scenario in the embodiments of the present invention, and this flow includes the following steps.

In step 601, the user initiates a handover notification message to the MMCF, which message carries the user identifier and a candidate access point list.

In step 602, the MMCF sends an available resource query message to the RACF, which message carries the user identifier and the candidate access point list.

In step 603, the RACF discovers the PCRF of the home network according to the user identifier and sends a user media stream resource information query message to the PCRF of the home network, which message carries the user identifier.

In step 604, after having received the query message, the PCRF of the home network replies the user information and the degrade information of the user to the RACF of the visited network.

In step 605, the RACF carries out resource availability check and resource decision.

The particular check and decision process can be made reference to the flow in FIG. 5.

In step 606, the RACF replies an available resource query response message to the MMCF, which message carries the resource decision result, including the resource state of the access network and the parameter for indicating whether or not already degraded of each candidate access network.

In step 607, the MMCF replies a response message to the UE, which message carries the handover decision result.

A system for implementing the above method includes: an MMCF entity, an RACF entity, and a resource and admission control platform, wherein the MMCF entity is configured to send an available resource query message to the RACF entity of the visited network when preparing for handover;

the RACF entity of the visited network comprises a receiving unit, a sending unit, a resource availability checking unit and a resource deciding unit, wherein the receiving unit is configured to: receive the available resource query message sent by the MMCF entity and receive degrade information of current service of a user fed back by the resource and admission control platform;

the sending unit is configured to send a request of acquiring the degrade information of the current service of the user to the resource and admission control platform;

the resource availability checking unit is configured to, according to a candidate access network list in the available resource query message, check the current resource availability of each candidate access network in the candidate access network list so as to obtain the resource availability information of each candidate access network;

the resource deciding unit is configured to carry out resource decision according to the degrade information, the resource availability information and user information of the user;

the resource and admission control platform is configured to feed back the degrade information of the current service of the user to the RACF entity of the visited network.

The further functions of the above units can be known in combination with the above method, which need not be described here redundantly.

Of course, the present invention can have several other embodiments, and those skilled in the art can make various corresponding modifications and variations according to the present invention without departing from the spirit and essence of the present invention, and these corresponding modifications and variations shall belong to the scope of protection of the appended claims of the present invention.

For example, in other embodiments, the RACF directly indicates a candidate access network with available resources and without needing to be degraded by way of other indication parameters instead of the parameter for indicating whether or not already degraded of the candidate access network, which can also achieve the technical effects of the present invention.

Industrial Applicability

As compared to the related art, the present invention can ensure that the user can still enjoy normal quality of service when roaming.

What I claim is:

1. A resource policy decision method in a roaming scenario, comprising:

after having received an available resource query message from a mobility management and control function (MMCF) entity, a resource and admission control function (RACF) entity of a visited network acquiring degrade information of current service of a user from a resource and admission control platform, and according to a candidate access network list in the available resource query message, checking current availability of resource of each candidate access network in the candidate access network list, so as to obtain resource availability information of each candidate access network, the degrade information comprises a parameter indicating whether or not already degraded, and the parameter indicating whether or not already degraded is used for indicating whether the current service of the user has been degraded;

the RACF entity of the visited network carrying out resource decision according to the degrade information, the resource availability information and user information of the user; wherein, if the current service of the user has been degraded, then in addition to choosing the candidate access network with the available resources meeting demand of the current service of the user, further choosing the candidate access network with the available resources meeting demand of the original resource information of the service of the user; and/or if the current service of the user has not been degraded, then in addition to choosing the candidate access network with the available resources meeting the demand of the current service of the user, in case the current service of the user allows degradation, further choosing the candidate access network with the available resources meeting the demand of the degraded service of the user.

2. The method as claimed in claim 1, wherein
the user information comprises resource information of the current service of the user and original resource information of the service of the user.

3. The method as claimed in claim 2, wherein
the resource information of the current service of the user and the original resource information of the service of the user comprises one or any combination of: bandwidth information and priority information.

4. The method as claimed in claim 1, wherein
the resource and admission control platform refers to an RACF entity of a home network or a policy and charging rule function PCRF entity of the home network.

5. The method as claimed in claim 1, wherein
the step of the RACF entity of the visited network checking current availability of resource of each candidate access network in the candidate access network list comprises the RACF entity of the visited network checks whether each candidate access network has available resources.

6. The method as claimed in claim 1, wherein
the degrade information further comprises a parameter indicating whether able to degrade, and the parameter indicating whether able to degrade is used for indicating whether degrade operation is allowed for the quality of service QoS of the current service of the user in case of insufficient resources.

7. The method as claimed in claim 6, wherein
the step of the RACF entity of the visited network carrying out resource decision according to the degrade information, the resource availability information and user information of the user further comprises:
if the RACF entity of the visited network judges that the current resources of a certain candidate access network fail to meet the demand of the current service of the user, and the parameter for indicating whether or not already degraded of the current service of the user indicates that it has been degraded, then the RACF entity of the visited network feeding back to the MMCF entity that resource state of that candidate access network is unavailable;
if the RACF entity of the visited network judges that the current resources of a certain candidate access network fail to meet the demand of the current service of the user, but the parameter for indicating whether or not already degraded of the current service of the user indicates that it has not been degraded and the parameter indicating whether able to degrade indicates that the degrade operation is allowable, then the RACF entity of the visited network further judging whether the current resources of that candidate access network can meet the demand of the degraded service of the user, if yes, then the RACF entity of the visited network configuring the parameter for indicating whether or not already degraded of that candidate access network as already degraded, and feeding back to the MMCF entity that the resource state of that candidate access network is available, by which the parameter for indicating whether or not already degraded of that candidate access network is carried at the same time;
if the RACF entity of the visited network judges that the current resources of a certain candidate access network can meet the demand of the current service of the user, then it feeds back to the MMCF entity that the resource state of that candidate access network is available.

8. The method as claimed in claim 7, wherein
the step of if the RACF entity of the visited network judges that the current resources of a certain candidate access network can meet the demand of the current service of the user, then it feeds back to the MMCF entity that the resource state of that candidate access network is available comprises:
after the RACF entity of the visited network judges that the current resources of a certain candidate access network can meet the demand of the current service of the user, the RACF entity further judging whether the parameter for indicating whether or not already degraded of the current service of the user is already degraded, if yes, then the RACF entity judging whether the current resources of the candidate access network can meet the demand of the original resource information of the service of the user according to original resource information of the service of the user, if yes, then the RACF entity feeds back to the MMCF entity that the resource state of that candidate access network is available, if not, then the RACF entity configuring the parameter for indicating whether or not already degraded of that candidate access network as already degraded, and carrying the parameter for indicating whether or not already degraded of that candidate access network while feeding back to the MMCF entity that the resource state of that candidate access network is available.

9. The method as claimed in claim 7, further comprising:
after the RACF entity of the visited network has carried out resource decision, the RACF entity feeding back a resource decision result to the MMCF entity; and the MMCF entity selecting an available access network for the user according to the resource decision result and takes the selected access network as a handover decision result to feed back to the user.

10. The method as claimed in claim 9, wherein the step of selecting an available access network for the user comprises:
judging whether there is an available access network without needing to be degraded, if yes, then selecting the available access network without needing to be degraded; and if not, then selecting the degraded available access network.

11. The method as claimed in claim 10, wherein
the resource decision result comprises the resource state information of each candidate access network in the candidate access network list, and the parameter for indicating whether or not already degraded, when the resource state information of a certain candidate access network indicates available, of that candidate access network, wherein, the parameter for indicating whether or not already degraded of that candidate access network is used for indicating if the user accesses that candidate access network, then the service of the user needs to be degraded or still needs to maintain the state of the current degraded service.

12. The method as claimed in claim 1, further comprising:
after the RACF entity of the visited network has carried out resource decision, the RACF entity feeding back a resource decision result to the MMCF entity; and the MMCF entity selecting an available access network for the user according to the resource decision result and takes the selected access network as a handover decision result to feed back to the user.

13. The method as claimed in claim 12, wherein the step of selecting an available access network for the user comprises:
judging whether there is an available access network without needing to be degraded, if yes, then selecting the available access network without needing to be degraded; and if not, then selecting the degraded available access network.

14. The method as claimed in claim 13, wherein
the resource decision result comprises the resource state information of each candidate access network in the candidate access network list, and the parameter for indicating whether or not already degraded, when the resource state information of a certain candidate access network indicates available, of that candidate access network, wherein, the parameter for indicating whether or not already degraded of that candidate access network is used for indicating if the user accesses that candidate access network, then the service of the user needs to be degraded or still needs to maintain the state of the current degraded service.

15. A resource policy decision system in a roaming scenario, comprising: a mobility management and control function (MMCF) entity, a resource and admission control function (RACF) entity of a visited network and a resource and admission control platform, wherein
the MMCF entity is configured to send an available resource query message to the RACF entity of the visited network when preparing for handover;
the RACF entity of the visited network comprises a receiving unit, a sending unit, a resource availability checking unit and a resource deciding unit, wherein the receiving unit is configured to: receive the available resource query message sent by the MMCF entity and receive degrade information of current service of a user fed back by the resource and admission control platform;

the sending unit is configured to send a request of acquiring the degrade information of the current service of the user to the resource and admission control platform;

the resource availability checking unit is configured to, according to a candidate access network list in the available resource query message, check the current resource availability of each candidate access network in the candidate access network list so as to obtain the resource availability information of each candidate access network;

the resource deciding unit is configured to carry out resource decision according to the degrade information, the resource availability information and user information of the user;

the resource and admission control platform is configured to feed back the degrade information of the current service of the user to the RACF entity of the visited network;

wherein the degrade information comprises a parameter indicating whether or not already degraded, and the parameter indicating whether or not already degraded is used for indicating whether the current service of the user has been degraded;

the resource deciding unit is further configured to, if the current service of the user has been degraded, besides choose the candidate access network with the available resources meeting demand of the current service of the user, further choose the candidate access network with the available resources meeting demand of the original resource information of the service of the user; and/or if the current service of the user has not been degraded, besides choose the candidate access network with the available resources meeting the demand of the current service of the user, in case the current service of the user allows degradation, further choose the candidate access network with the available resources meeting the demand of the degraded service of the user.

16. The method as claimed in claim 1, further comprising:
after the RACF entity of the visited network has carried out resource decision, the RACF entity feeding back a resource decision result to the MMCF entity; and the MMCF entity selecting an available access network for the user according to the resource decision result and takes the selected access network as a handover decision result to feed back to the user.

17. The method as claimed in claim 16, wherein the step of selecting an available access network for the user comprises:
judging whether there is an available access network without needing to be degraded, if yes, then selecting the available access network without needing to be degraded; and if not, then selecting the degraded available access network.

18. The method as claimed in claim 17, wherein
the resource decision result comprises the resource state information of each candidate access network in the candidate access network list, and the parameter for indicating whether or not already degraded, when the resource state information of a certain candidate access network indicates available, of that candidate access network, wherein, the parameter for indicating whether or not already degraded of that candidate access network is used for indicating if the user accesses that candidate access network, then the service of the user needs to be degraded or still needs to maintain the state of the current degraded service.

* * * * *

UNITED STATES PATENT AND TRADEMARK OFFICE
CERTIFICATE OF CORRECTION

| | |
|---|---|
| PATENT NO. | : 8,983,456 B2 |
| APPLICATION NO. | : 13/258443 |
| DATED | : March 17, 2015 |
| INVENTOR(S) | : Jianjie You |

It is certified that error appears in the above-identified patent and that said Letters Patent is hereby corrected as shown below:

Title page:

Item (54) Title and in the Specification, column 1, line 1-3

Should read as follows: -- Method and System for Resource Policy Decision in Roaming Scene --.

Signed and Sealed this
Twelfth Day of July, 2016

Michelle K. Lee
*Director of the United States Patent and Trademark Office*